Patented Feb. 27, 1923.

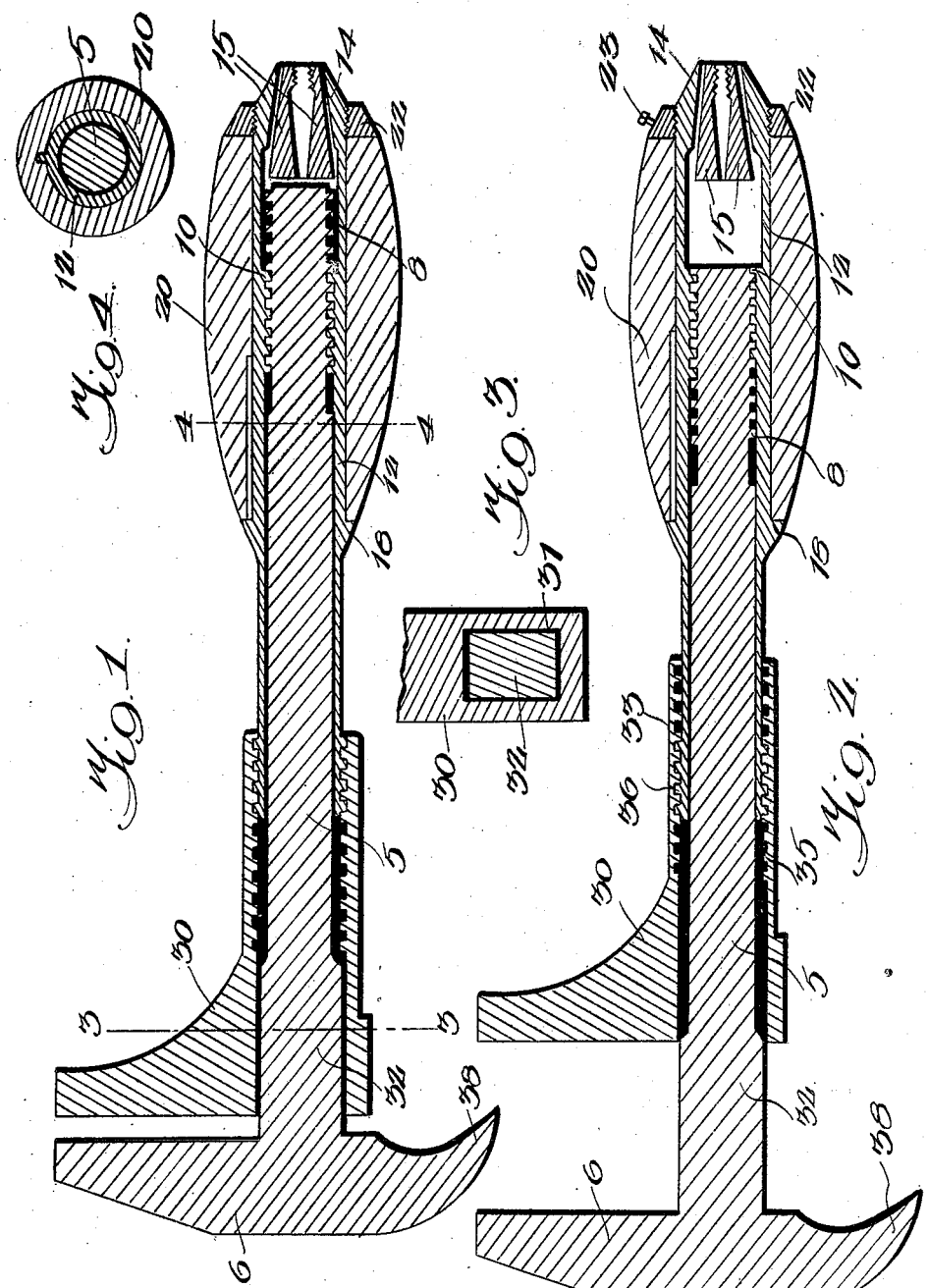

1,446,904

UNITED STATES PATENT OFFICE.

HARRY H. JONES, OF HOLLAND, OREGON.

TOOL.

Application filed March 11, 1921, Serial No. 451,597. Renewed July 27, 1922. Serial No. 577,971.

*To all whom it may concern:*

Be it known that I, HARRY H. JONES, a citizen of the United States, and a resident of Holland, and county of Josephine and State of Oregon, have invented certain new and useful Improvements in Tools, of which the following is a specification.

This invention relates to improvements in tools having means for performing a variety of functions.

An important object of this invention is to provide a tool embodying a chuck having novel means whereby the jaws of the same may be closed when it is desired to engage the head of a bit.

A further object of the invention is to provide a tool of the class described wherein the operating or gripping handle of the same is employed as a stationary jaw of a wrench.

A further object of the invention is to provide a tool of the class described which is simple to operate few of parts and cheap to manufacture.

Other objects and advantages of the invention will be apparent during the course of the following description.

In the accompanying drawing, forming a part of this application and in which like numerals are employed to designate like parts throughout the same, Figure 1 is a longitudinal sectional view through a tool embodied in the invention, the view illustrating the chuck of the same in its operative position.

Figure 2 is a similar view, the view illustrating the chuck in its inoperative position.

Figure 3 is a vertical transverse sectional view taken on line 3—3 of Figure 1.

Figure 4 is a vertical transverse sectional view taken on line 4—4 of Figure 1.

In the drawing wherein for the purpose of illustration is shown a preferred embodiment of the invention, the numeral 5 designates a shank having its rear end portions formed with a laterally projecting head 6 which forms a means whereby the shank 5 may be gripped in the operation of the improved tool. That is to say, the enlargement 6 at the rear end of the shank 5 is adapted to be manually gripped in the operation of of the tool.

One end portion of the shank 5 is formed with right hand screw threads 8 adapted to be engaged with the screw threads 10 formed on the interior wall of a sleeve or tubular member designated by the numeral 12. As illustrated in Figure 1, the interior screw threads 10 are formed intermediate the ends of the threaded sleeve 12 and when the sleeve 12 is rotated the same will be moved longitudinally with relation to the shank 5. The forward end portion of the sleeve 12 is formed with a tapered bore 14 within which is arranged the jaws 15 of a chuck. When the sleeve 12 is rotated in a clockwise direction on the shank 5, the forward end of the shank 5 will engage the jaws 15 and thereby advance the same. By thus advancing the jaws 15 the same contact with the inclined side walls of the sleeve 12 and are moved inwardly into engagement with the head of a bit which is received between the jaws. In this manner, a bit may be securely connected to the tool.

As illustrated in Figure 1 the intermediate portion of the sleeve 12 is formed with an annular shoulder 18 with which the forward end of a tubular grip 20 contacts. The tubular grip 20 is held against rotation with relation to the sleeve 12 by any suitable means and is securely held on the sleeve by means of a sleeve nut 22 which is threaded on the forward portion of the sleeve. A set screw 23 is threaded through the nut 22 and engages the sleeve 12 so as to securely hold the nut in position and prevent the accidental loosening of the sleeve or grip 20.

A sliding jaw 30 is provided with a squared opening 31 to slidably receive the squared portion 32 of the shank 5 and said jaw 30 cooperates with the enlargement 6 to form a wrench adapted for engaging nuts of various sizes. The jaw 30 is provided with a tubular portion 33 which is formed with interior left hand screw threads 35 with which the left hand screw threads 36 at the rear portion of the sleeve 12 are engaged. When the sleeve 12 is turned in a clockwise direction the movable jaw 30 will be moved in the direction of the stationary portion 6. On the other hand, when the grip 20 and consequently the sleeve 12 is rotated in an anti-clockwise direction, the jaw 30 will be moved away from the stationary jaw 6.

The enlargement 6 is formed at one end with a curved portion or finger grip 38 which is adapted to be engaged by the fingers of the operator so that a firm hold may be had on the device. In addition to a finger grip, the curved portions 38 may be used as a nail extractor.

Having thus described the invention, what is claimed is:—

A wrench comprising a shank having a stationary jaw at its forward end and screw threaded at its rear end, a sliding jaw mounted on said shank and provided with an interiorly screw threaded tubular portion, a sleeve mounted on said shank and having exterior screw threads located only at its forward portion and engaged with the threads of said tubular portion, the intermediate portion of said sleeve also being threaded for engagement with the threads on the end of said shank, said end of said shank and the adjacent portion of said sleeve being opposite from the threads on said tubular portion and the adjacent portion of said sleeve, said sleeve constituting a combined holding means and adjusting means for the sliding jaw, the tubular portion of said sliding jaw forming a means for concealing the threads on said sleeve at all positions of the wrench.

HARRY H. JONES.